Nov. 8, 1966          J. A. POTTER          3,283,599
TOGGLE SWITCH INDICATIVE OF ROTATIONAL DIRECTION OF ROTOR
Original Filed Feb. 24, 1964          3 Sheets-Sheet 1
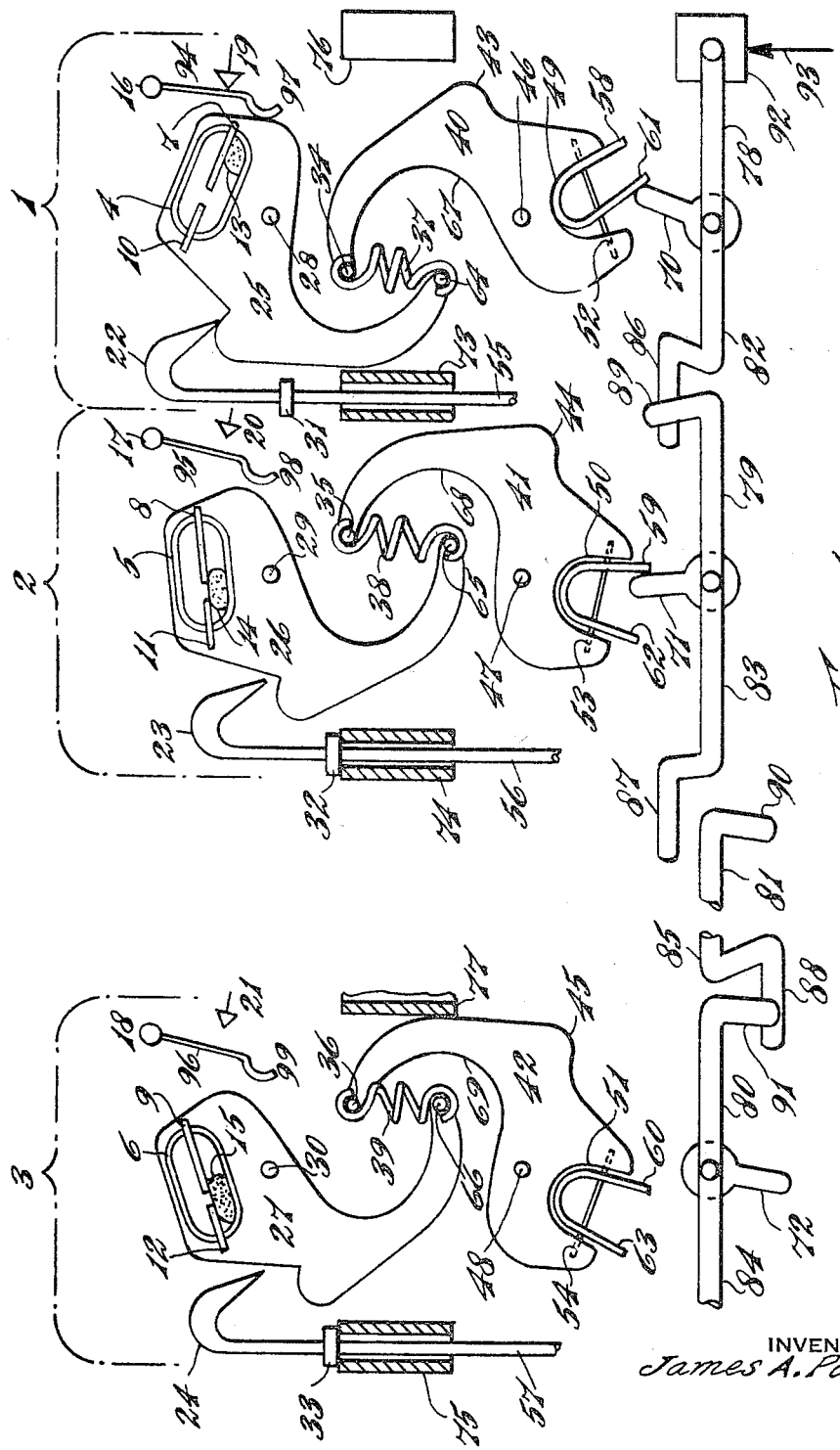
INVENTOR
James A. Potter Nov. 8, 1966  J. A. POTTER  3,283,599
TOGGLE SWITCH INDICATIVE OF ROTATIONAL DIRECTION OF ROTOR
Original Filed Feb. 24, 1964  3 Sheets-Sheet 2
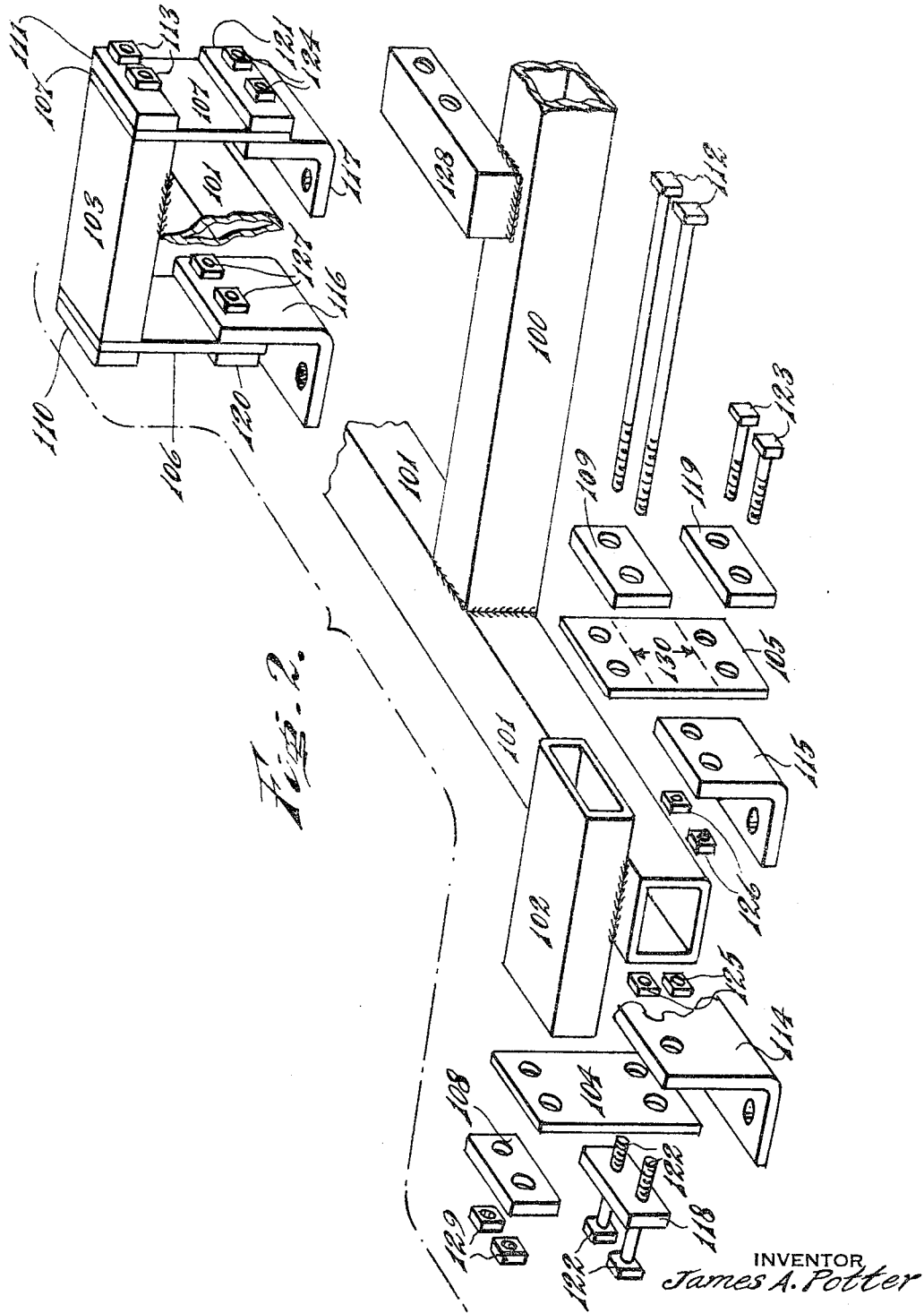
INVENTOR
*James A. Potter*

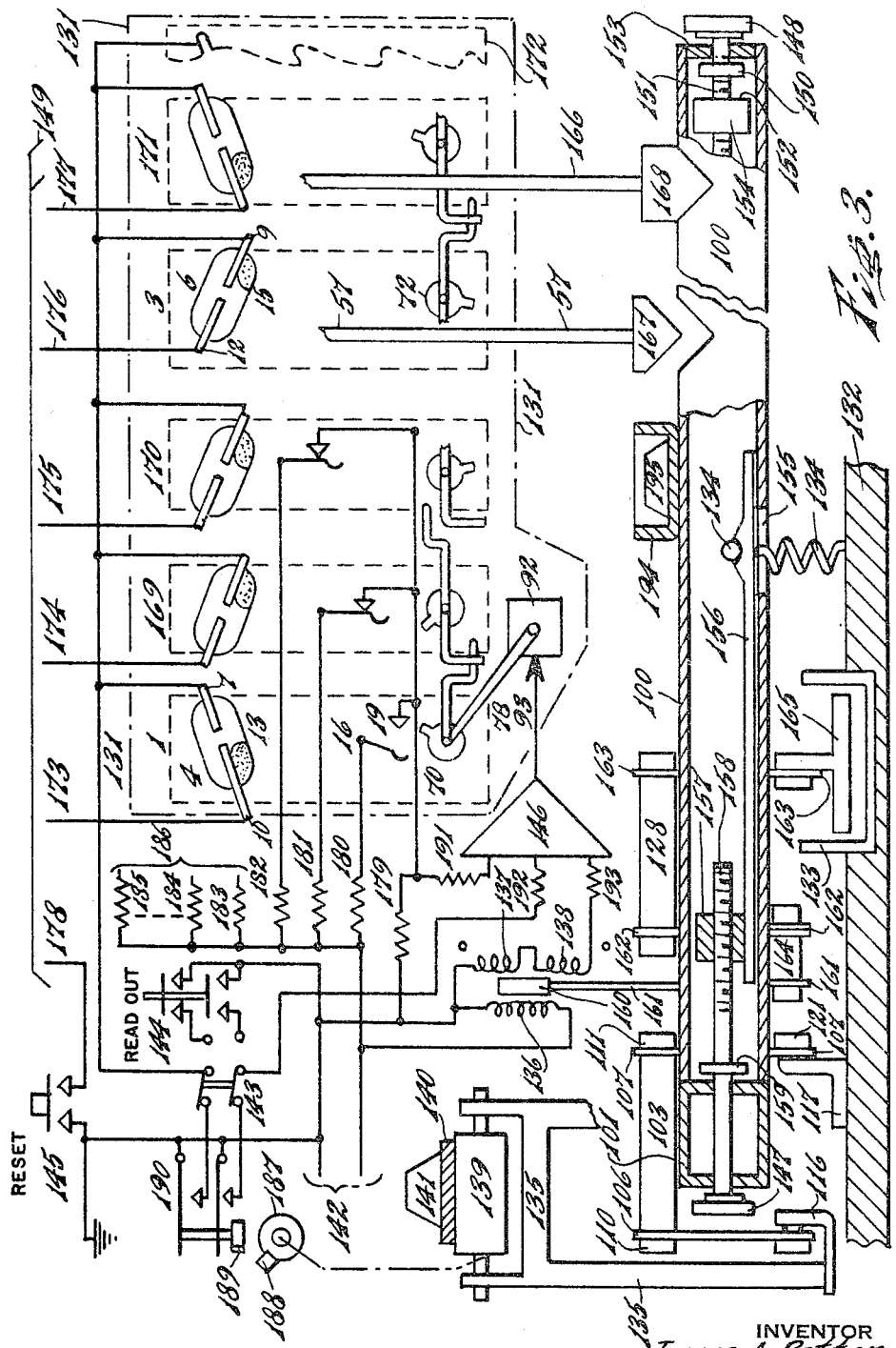

United States Patent Office 3,283,599
Patented Nov. 8, 1966

3,283,599
TOGGLE SWITCH INDICATIVE OF ROTATIONAL DIRECTION OF ROTOR
James A. Potter, 12 Green House Blvd., West Hartford, Conn.
Original application Feb. 24, 1964, Ser. No. 346,630, now Patent No. 3,224,518, dated Dec. 21, 1965. Divided and this application May 3, 1965, Ser. No. 465,224
3 Claims. (Cl. 74—97)

This application is a compulsory division of Ser. No. 346,630, filed Feb. 24, 1964, now U.S. Pat. 3,224,518, which was a continuation-in-part of Ser. Nos. 55,847 and 223,427, and all the disclosure of each of said applications is deemed here reiterated in clarifying the operation of a remote display device actuated by mercury switches. Said Ser. No. 55,847, filed Sept. 14, 1960 was replaced by continuation Ser. No. 455,464, filed May 13, 1965, and issued as U.S. Pat. 3,211,991. Said Ser. No. 223,427, filed Sept. 13, 1962, was replaced by streamlined continuation Ser. No. 538,867, filed March 30, 1966.

This invention relates to systems in which a bistable mechanism has a pair of pivoted members and a spring yieldingly urging the pivoted members to either an advanced or a withdrawn position, there being a rotor adapted to shift the bistable mechanism between such positions.

The accompanying drawings disclose an illustrative embodiment clarifying the principles of my invention.

FIGURE 1 is a schematic representation of my motor-driven switch-actuator. In FIGURE 1, each of the sequentially driven mechanisms is of a bi-stable kind, and each mechanism initiates an appropriate readout signal each time it changes state to provide a rebalance signal.

Referring now to FIGURE 1 for description of my switch-actuator, it is to be noted that the main support structure is not illustrated. Those skilled in the construction of switch activator mechanisms readily recognize that suitable means would be provided for supporting bearings, stops and framework in the rigid relative positions required for them to operate as described herein. As shown schematically in FIGURE 1, a motor 92 drives the first of a series of mechanism, each mechanism driving the next mechanism in the series. Mechanism 1 is driven directly by motor 92. Mechanism 1 drives mechanism 2. Mechanism 2 drives an intermediate mechanism not illustrated. Mechanism 3 is driven by another intermediate mechanism not illustrated. Mechanism 3 drives still another mechanism not shown. Intermediate mechanisms are mentioned in connection with FIGURE 1 to indicate that dozens of mechanism closely similar to mechanisms 1, 2, and 3 can be arranged as taught by my invention so that each in the series is driven by the next preceding mechanism, except that the first in the series is driven by the motor. Each such mechanism is associated with one bit of digital data corresponding to the quantity of rebalancing effect it contributes to the measuring arrangement. The following description pertains to mechanism 1; but it can be read as pertaining to mechanism 2 by transliteration of reference numbers to the next higher number; and it can be read for mechanism 3 by transliteration of each reference number to the second next higher number.

The operation of mechanism 1 in FIGURE 1 can be understood by noting that members 25 and 50 are free to rotate to a limited angular extent about their respective bearings 28 and 46. The two members are caused to move in co-operation by reason of tension spring 37, which exerts a continuous force urging pins 64 and 34 towards each other. Pins 64 and 34 are fastened to their respective carrying members 25 and 40. This interrelation between the spring 37 and members 25 and 40 exerts torques upon the rotary members 25 and 40 so that they seek to move toward one of the two limits of their respective ranges of rotation. FIGURE 1 illustrates stop 73 restraining member 25 from any further clockwise rotation, while spring 37 continues to exert a clockwise torque upon 25. This condition brings pin 64 to a fixed position with respect to the supporting structure so that member 40 will seek a position of rest without a separate stop to restrict its counter-clockwise motion. However, it is preferable to provide a separate stop, not illustrated, to establish a separate limit for the counter-clockwise rotation of member 40.

Member 25 has contours of its outer periphery such that it engages lifting hook 22 and finger 97 as it approaches the clockwise limit of its rotation. In the positions illustrated for mechanism 1, the member 25 has fully engaged lifting hook 22 so as to lift it upward and continue to support it in an elevated position, and has pushed finger 97 outward, to hold it in its outward position. Rod 55 is an extension of hook 22, and collar 31 is securely fastened to both of them, and this assembly is loosely fitted through a hole in stop 73 so as to slide freely up and down when picked up and dropped by the engagement and disengagement of the shoulder on member 25 with hook 22.

Contact spring 94, terminal 16, finger 97, and contact 19 comprise an electrical switch operated by the cam-like contour on the periphery of member 25; and the circuit between 16 and 19 is shown complete in mechanism 1 of FIGURE 1. Another electrical switching circuit in mechanism 1 is a mercury switch 13A composed of sealed enclosure 4, electrode 7, electrode 10, and mercury globule 13. The mercury switch 13A is secured to be carried in rotation by member 25 by means of fastening its sealed enclosure 4 to member 25. The mercury switch 13A is so oriented in its mounting upon member 25 that electrodes 7 and 10 are open-circuited in the clockwise position of rest for 25, as illustrated in mechanism 1 of FIGURE 1. Cam-like surface 43 on member 40 is provided to actuate additional switch fingers when they are required for auxiliary signals, but no such additional fingers nor switches are illustrated.

The lower extension of member 40 contains a slot 49 which is of suitable contour and dimensions to retain flat spring 58, 61. Pin 52 is also required to retain the spring 58, 61 in the required orientation in the mechanism. Pin 52 is secured at both ends to the member 40 at the sides of slot 49, and passed loosely through clearance holes in spring 58, 61.

In FIGURE 1, rotors 70, 71, and 72 are shown as capable of rotating in either a clockwise or a counterclockwise direction. The motor 92 can rotate in either a clockwise or counterclockwise direction or be motionless, depending upon the nature of the signal 93. It is important that it be recognized that FIGURE 1 schematically shows that when the signal 93 is making a correction, the signal 93 actuates the motor 92 to rotate at least one of a series of rotors such as rotors 70, 71, and 72 in either a clockwise or a counterclockwise direction. The shafts which drive rotors 70, 71, and 72 necessarily rotate in the corresponding clockwise direction, or counterclockwise directions, but in illustrating the backlash driving of the series of shafts in FIGURE 1, it is convenient to think of bevel gearing (not shown) between each of the rotors 70, 71, and 72 and motor 92 and the corresponding shafts. Thus, as signal 93 drives motor 92 clockwise to drive shaft 78 clockwise to drive 70 clockwise to drive shaft 82 clockwise to drive crank 86 clockwise to overcome the backlash to engage offset 89 to drive shaft 79 clockwise to drive rotor 71 clockwise to drive shaft 83 and crank 87 clockwise, the series operation can be understood, notwithstanding the difficulty in illustrating all of the clockwise rotation while still clarifying the series operation and predetermined backlash of the corresponding series drive of rotor 71 in a counterclockwise direction by motor 92 when appropriately directed by signal 93.

Rotor 70 rotates in the same direction as its drive shaft 78, 82. Crank extension 86 has a axis parallel to the axis of rotation of shaft 82, and its axis of rotation is the same as that of shaft 82 because it is attached as a crank to it. Crank extension 86 is arranged to engage shaft offset 89, but a large amount of clearance of rotation is allowed between the two, so that there is exhibited a large amount of backlash between the two. The magnitude of backlash may be on the order of a few degrees to 359 degrees. Preferably backlash is of the order of 50 to 320 degrees. Bearings not shown for shaft 78, 82 are rigidly attached to the supporting framework and are so equipped as to restrict axial motion of the shaft so that rotor 70 will at all times be able to engage spring 58, 61 when rotated.

Bearing 28, bearing 46, stop 73, and spring-holding terminal 16 are rigidly attached to the support structure. The angular position which rotor 70 has attained at the moment illustrated in mechanism 1 of FIGURE 1 was attained in clockwise rotation. At the moment of the illustration, the end of rotor 70 is in the process of pushing aside spring end 61 in the course of its rotation. If shaft 78 is driven additional revolutions in the clockwise direction the tip of rotor will push aside spring tip 61 once during each revolution. As the tip of rotor 70 rotates in the clockwise direction beyond spring tip 61, the spring tip 61 springs back against the side of slot 49, and will then be in position for a driving engagement whenever rotor tip of 70 reverses to approach it in counterclockwise rotation. In the position illustrated in mechanism 1, spring tip 58 is in a position far enough from the center of rotor 70 so that the tip of rotor 70 clears it. This concludes the portion of the description in which the description for mechanism 1 can be transliterated into descriptions for mechanisms 2 and 3.

Energy path 93 is the only source of drive power for the switch-actuator assembly of FIGURE 1, and is so arranged that it can cause motor 92 to rotate shaft 78 either clockwise or counterclockwise, or to allow it to coast to a stop, in a manner similar to the operation of conventional servomechanism drives or the drives for follow-up systems. FIGURE 1 shows the switch actuator assembly during a moment of time when the motor 92 is driving rotor 70 in a clockwise direction; and, having taken up the backlash between crank extension 86 and shaft offset 89, drive torque is driving rotor 71 in clockwise rotation. The tip of rotor 71 has just engaged spring tip 59, and has started to drive member 41 in counterclockwise rotation. Member 41 has moved away from stop 73, and has caused member 26 to start rotating clockwise. A continuation of the driving forces will cause tension spring 38 and the associated pins 35 and 65 to move beyond their dead center, and the spring will cause member 26 to snap quickly against its stop 74, and mechanism 2 will have assumed the position of equilibrium illustrated in mechanism 1. After 41 has assumed the position shown for 40, continued clockwise drive of rotor 71 will cause repeated flexing of spring tip 62; but the continued rotation in the same direction will cause no further change in the state of equilibrium of mechanism 2. As clockwise rotation continues, the backlash between crank extension 87 and shaft offset 90 will be reduced until contact is made between the two of them and shaft 81 is driven in a clockwise direction. As clockwise drive continues, the backlash provided in each of the mechanisms intermediate between shafts 81 and 85 will be taken up, and rotor 72 will start to rotate clockwise. If rotation stops or reverses before the tip of rotor 72 engages spring tip 60, no disturbance of the condition of equilibrium illustrated for mechanism 3 will be imposed. If, however, the tip of rotor 72 is driven into spring tip 60 and continues its course, member 42 will be driven counterclockwise away from its position of rest against stop 77 into the unstable condition illustrated for mechanism 2.

The whole of FIGURE 1 functions as a driven switch-actuator system in response to the driving power delivered at input path 93. The motor 92 is caused to stop and start in a variety of sequences dictated by the control signals present in the interruption and reversing of power applied to path 93. Only one of the mechanisms 1, 2, or 3 changes from one state of equilibrium to another at a time.

Various mercury switch arrangements are possible without departure from the invention. Prior art descriptions include both the end closing type, in which the length and positioning of the electrodes permits the closing of the switch in a preselected sloping position, and the middle closing type, in which the length and positioning of the electrodes permits the switch to be open in the two alternative sloping positions, but to close momentarily to send a pulse during the shifting between such two alternative sloping positions. If the remote display device is dependent upon a series of pulse signals, then the middle closing type mercury switches will be employed, but otherwise the end closing type of mercury switch would be used. Substitution of the correct type of mercury switch to comply with the needs of the remote display device can be made without departing from the invention. In an effort to illustrate both types and the ease of substitution thereof, mechanism 3 of FIG. 1 shows an end-closing type of mercury switch and mechanisms 131 and 171 of FIG. 3 show the middle closing type of mercury switch. The term "mercury switch" embraces all switches utilizing a pool of liquid conductor flowable from opposite ends of a tiltable container.

Various modifications of the invention are possible without departing from the several inventive concepts herein disclosed and set forth in the appended claims.

The invention claimed is:

1. In a bistable switch actuable by a rotor, the combination of: a support structure; a spring; a pair of pivoted members mounted in said support and normally urged by the spring toward one of the stable positions but yieldingly shiftable to the other of the stable positions by limited angular movement of the pivoted members; yielding means operatively connected to one of said members adapted to engage the rotor during its first passage adjacent said one pivoted members for shifting the bistable switch to a position indicative of the direction of rotation of the rotor and thereafter permitting continued rotation of the rotor in said direction; and switch means actuated by the position of at least one of the pivoted members.

2. A bistable switch of claim 1 in which the yielding means comprises a U-shaped spring having two spring tips extending from a slot in said one pivoted member, said spring tips being positioned relative to the rotor so that orientation of the bistable switch is controlled by the direction of rotation of the rotor during the most recent passage adjacent to the pivoted member.

3. In a bistable switch having two stable positions and actuatable by a rotor, the combination of: a support structure; a pair of parallel bearings spaced a significant distance apart on the support structure, a line connecting the axes of the bearings constituting a significant portion of the major dimension of the support; a pair of pivoted members, each member being pivoted for limited angular movement on one of said bearings, each pivoted member having a curved finger extending toward a tension spring support; a tension spring between the spring supports of the pivoted members, said spring being significantly shorter than the distance between the two bearings, said spring normally pulling the fingers of the two pivoted members toward each other in one of the two stable positions, but yieldingly stretching to permit shifting to the other stable position, such shifting causing the spring to shift transversely relative to said line connecting the axes of the bearings; stop means on the support structure limiting the angle of the arcuate movement of at least one of the pivoted members; means on one of the pivoted members responsive to the rotor and adapted to shift the bistable switch to indicate the direction of rotation of the rotor during the most recent passage adjacent to the pivoted member; and switch means actuated by the position of at least one of the pivoted members.

References Cited by the Examiner

UNITED STATES PATENTS

| | | | |
|---|---|---|---|
| 1,748,307 | 2/1930 | Peters | 200—153.15 |
| 2,483,122 | 9/1949 | Bower | 200—61.39 |

FOREIGN PATENTS 271,495 2/1951 Switzerland.

FRED C. MATTERN, Jr., *Primary Examiner.*

F. E. BAKER, *Assistant Examiner.*